United States Patent [19]
Guangrun et al.

[11] Patent Number: 5,159,521
[45] Date of Patent: Oct. 27, 1992

[54] LIGHTNING ELIMINATOR

[75] Inventors: Xie Guangrun; Chen C. Xuan, both of Wuhan, China

[73] Assignee: Wuhan University of Hydraulic and Electric Engineering, China

[21] Appl. No.: 666,298

[22] Filed: Mar. 8, 1991

[51] Int. Cl.$^5$ .............................................. H02H 3/22
[52] U.S. Cl. ..................... 361/117; 361/126; 361/218
[58] Field of Search ............... 361/117, 222, 126, 218, 361/225; 174/2, 3, 4

[56] References Cited

U.S. PATENT DOCUMENTS

| | | | |
|---|---|---|---|
| 4,698,723 | 10/1987 | Bryan, Jr. | 361/222 |
| 4,760,213 | 7/1988 | Gumley | 174/3 |
| 4,926,284 | 5/1990 | Eugenio | 361/117 |
| 5,073,678 | 12/1991 | Carpenter, Jr. | 174/3 |

*Primary Examiner*—A. D. Pellinen
*Assistant Examiner*—Stephen Jackson
*Attorney, Agent, or Firm*—James G. Staples

[57] ABSTRACT

A lightning eliminating device for reducing the possibility of thunder strokes comprises a supporting base used for fitting semi-conductor rods, and a plural of semi-conductor rods fitted outwardly on the said base and having an elevation-angle or parallel with the ground reference, the two adjacent semi-conductor rods being electrically connected at the ends and separating from each other at the other ends at such a distance as will not cause a break-down voltage greater than the surface-wise flashover voltage generated on a single semi-conductor rod by thunder clouds. The semi-conductor rods may be made of the single variety of resistance material having a proper mechanical strength, or epoxy resin bars coated with semi-conducting materials such as zinc oxide, carbon black and resin. Even when there is a thunder stroke, the lightning eliminator will emasculate a strong stroke and reduce thunder current passing into the ground by 99%.

16 Claims, 1 Drawing Sheet

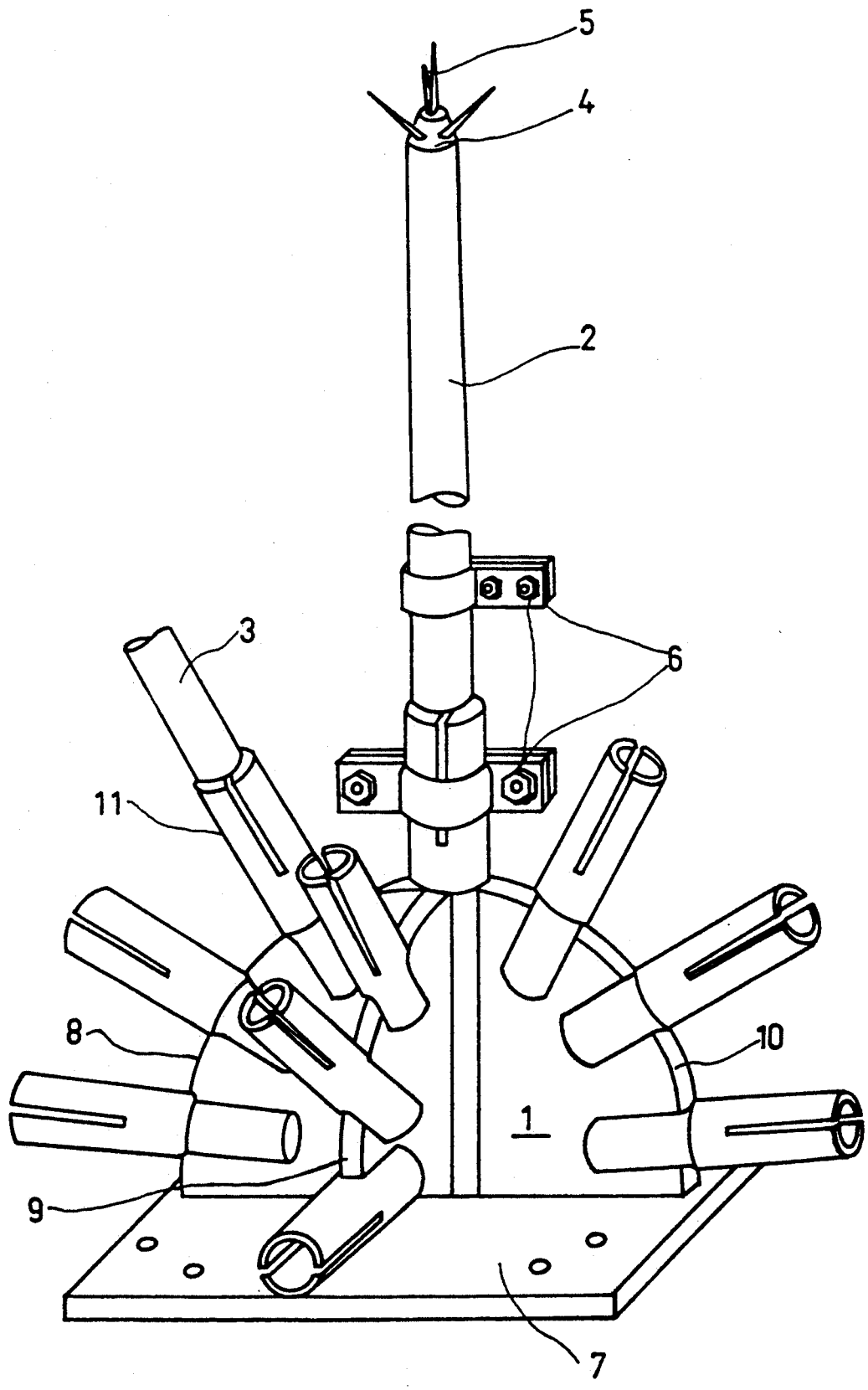

LIGHTNING ELIMINATOR

BACKGROUND

The invention relates to a lightning device, and more specifically, to a device which is able to partially neutralize charges generated by the electric field of thunder clouds and actively increase the load capacity of the down lead by effectuating discharging between the rods so as to reduce the possibility of thunder strokes.

The function of a traditional lightning arrester is to attract the electric field of thunder clouds to its vicinity and pass the lightning current through the lightning arrester and down lead into the ground. Since electrical voltage between the two terminals of the grounding lead are as high as several tens or even hundreds of thousands of volts, severe secondary hazards may occur.

Currently available lightning eliminators, such as the one filed in Chinese on Apr. 25, 1989, No. 89204797.6, have disclosed an "Induced Ionization Lightning Eliminator", which features a horizontally installed "H"-shaped frame with several short metal rods intended to increase the corona current and neutralize electric charges generated by the elctric field of thunder clouds, thus eliminates the possibility of thunder strokes. However, as this kind of device uses several short metal tips, the corona current generated are not great enough to neutralize electric charges generated by electric fields of powerful thunder clouds. When there is a stroke, comparatively great lightning current will still pass through the down lead into the ground and secondary hazards cannot possibly be eliminated completely. One of the purposes of the invention is to provide a lightning eliminating device capable of limiting the thunder current that passes into the ground.

Another purpose of the invention is to provide a lightning device which can increase the corona current, neutralize to the maximum extent electric charges generated by the electric fields of thunder clouds, actively increase the load capacity of the down lead, form a layer of electric charges at the top of the said lightning eliminator and effectively reduce the electric field strength of the thunder clouds, thus reducing the possibility of thunder strokes.

SUMMARY OF THE INVENTION

The lightning eliminator, according to the invention, comprises aupporting base used for fitting the semi-conductor rods and a plural of semi-conductor rods fitted outwardly on the base and having an elevation-angle or parallel with the ground reference electrically connected to the said base and at least one conductor tip fitted on top of the said semi-conductor rod to generate corona with thunder clouds, the breakdown voltage generated on account of the distance between the tops of adjacent semi-conductor rods being less than the surface-wise flash-over voltage on the surface of the said semi-conductor rods.

The invention uses several comparatively long semi-conductor rods to increase corona current. The corona current thus generated is 50 to 100 times greater than that generated by the above-mentioned induced inization lightning eliminating device, thus being able to neutralize to a much greater extent electric charges generated by the electric field of thunder clouds. In case the electric charges generated by the electric field of thunder clouds exceed the neutralizing capability of the said device, the break-down discharging between semi-conductor rods is utilized to actively increase the load capacity of the semi-conductor rods and the grounding down lead. Since the resistance of the semi-conductor rods is somewhere between a conductor and a non-conductor, only a small amount of thunder current passes into the ground and thunder current of such a magnitude will not cause any damage to surrounding resources.

DESCRIPTION OF THE DRAWING

One way of carrying out the invention is described in detail below with reference to the drawing which illustrates only one specific embodiment, in which:

The drawing shows one kind of configuration of the invention.

DESCRIPTION OF THE INVENTION

The drawing illustrates the structure of a semi-conductor lightning eliminator realized in accordance with the invention. The said semi-conductor comprises a supporting base, a plural of semi-conductor rods fitted outwardly on the base and having an elevation-angle or parallel with the ground reference, each such rods being connected to the base at their ends and at least one conductor tip fitted on other end. The base used to support the semi-conductor rods may be made into any geometric shape and of various kinds of materials. For usual installation, the bottom plane of the supporting base is parallel with the ground referenc. In order to ensure electrical connection between the installing end of each semi-conductor rod and the base. According to the embodiment of the invention, the base is usually made of conductors such as metal. In a real installation, the base has a bottom plane used for installing the lightning eliminator and has a number of installation sleeves for fitting semi-conductor rods, usually, the bottom plane of the base is parallel with the ground reference, the fitting of multi-semi-conductor rods being intended to increase the capability of the lightning eliminator to neutralize the electric field of thunder clouds. To facilitate installation, the sleeves on the base may be divided into several groups in such a way that each group of sleeves will enable the semi-conductor rods fitted into them to lie in the same plane which is at right angles with the bottom plane of the supporting base, and that adjacent semiconductor rods fitted into the sleeves are at acute angles with each other, these angles being 20° to 40° in most cases and, preferrably, 30°. To handle thunder clouds in all directions, planes formed by each group of semi-conductor rods may be made to divide the space over the base equally. As shown in the attached drawing, the lightning eliminator made good in accordance with the invention comprises a supporting base 1 which features a bottom plane 7. In most cases the supporting base is made of metal so that the semiconductor rod 2 fitted in the sleeve 6 and semi-conductor 3 fitted in sleeve 11,and their sleeves are electrically connected at one ends and that semi-conductors 2 and 3 form a plane 8. Similarly, other semiconductor rods may be fitted in groups each of which forms a plane at right angles with the bottom plane 7 of the supporting base 1. In order to cope with thunder clouds coming in all directions, plans 8, 9 and 10 are usually so located that they equally divide the space over the bottom plane 7 of the supporting base 1. In typically, semi-conductors are divided into 3 to 6 groups, thus forming 3 to 6 planes and dividing the space over the bottom plane 7 of the supporting base 1 into 3 to 6 equal parts.

The semiconductor rods according to the invention, may be made of linear or non-linear materials, their non-linearity being not greater than 35%, with proper mechanical strength and resistance of 10 to 100 k ohms. To save material while increasing mechanic strength, the semi-conductor rods may be made of semi-conductor coated, non-metal rods with proper mechanic strength. The said semiconductor coating may be a mixture of zinc oxide, carbon black and resin, which, after being applied to the nonmetal rods, give a total resistance ranging from 10 to 100 k ohms. In a preferred embodiment of the invention, the semiconductor rods are made of epoxy resin rods coated with a semiconductor material on the surface, the rods being 5 meters in length, and 5 centimeters in diameter, and the total resistance of the semi-conductor coating is 3K Ohms. protective painting may also be applied to the outer surface of the semiconductor rods. To make manufacturing easy, all the semi-conductor rods of a lightning eliminator are fabricated in same specification. the semiconductor rods may be made 2 to 10 meters long with a diameter of 2 to 10 centimeters. In a preferred embodiment of the invention, all the semi-conductor rods have a length of 5 meters, a diameter of 5 centimeters and a total resistance of 35 k ohms.

In order to attract the electric field of thunder clouds to the vicinity of the top of the semi-conductor rods and cause corona discharge, at least one metal conducting tip is usually fitted on top of the semi-conductor rod. In many cases, copper is chosen for the material for the metal conducting tip. The conducting tip usually extends axially from its semiconductor rod. To effectively cause the occurrence of corona between the semi-conductor rod and thunder clouds, a number of metal conducting tips are fitted on top of the semi-conductor rod and these metal conducting tips are fitted radially with respect to the top of a semi-conductor rod. As shown in the drawing, at the top 4 of the semi-conductor rod 2 are fitted four metal tips which are identical to the metal tip 5 and the said four metal tips are arranged radially from the top of the semi-conductor rod. The metal tips are usually 20 to 40 cm long and 3 to 5 mm thick. In a preferred embodiment of the invention, at the top of the semi-conductor rod, four copper tips are fitted with a length of 30 cm and a diameter of 4 mm.

One ends of any pair of adjacent semi-conductor rods are connected to the base, and the ends connecting to the base are connected to each other electrically and are at the same electric potential while the other ends are separated from each other by a certain distance, the distance separating them being such that the brakdown voltage generated is not greater than the surface-wise flashover voltage on the surface of a single semi-conductor rod. The break-down voltage in air of normal thunder cloud conditions is 20 to 40 kv/m while the surface-wise flashover voltage on the semi-conductor rod varies with the value of resistance of the relevant semiconductor rod. Therefore, the distance between the tops of adjacent semi-conductor rods should be adjusted accordingly. The large quantity of monopolar charges generated by the electric field of thunder clouds in the vicinity of the base are prevented from passing through the semiconductor rods into the ground by the current-limiting semi-conductor rods. Thunder strokes, therefore, will not be attracted directly to the lightning eliminator. Also thanks to the current limiting capability of the semi-conductor rods, the corona current of a lightning eliminator comprising numerous semi-conductor rods can be increased to an amount which is usually 50 to 100 times greater than the corona current of the afore-mentioned induced ionization lightning eliminator. Neutralizing capability of such a magnitude will be able to neutralize to a great extent electric charges generated by the electric field of thunder clouds. Therefore, the discharging voltage between thunder clouds and the lightning eliminator according to the invention exceeds that of the above-mentioned induced ionization lightning eliminator by 16.8%. In the course of neutralization, the small residul lightning current is passed into the ground. Being of a small magnitude, the residual current will not cause any damage to the resources. If an excessive quantity of electric charges are generated by the electric field of thunder clouds and the corona courrent, though already increased, is still not strong enough to neutralize the excessive current beyound the load capacity of the semi-conductor rods and the down lead, the electric field of thunder clouds will be allowed to cause electric breakdown between adjacent semiconductor rods. The breakdown strength of the air under thunder clouds conditions is 20 to 40 kv/m. Once there is a breakdown between adjacent semiconductor rods, the resistance of the two adjacent semi-conductor rods will be in parallel connection and their total resistance will be reduced by half. In this manner, the load capacity of the semiconductor rods and the grounding down lead is actively increased. Just before the surface-wise flash-over takes place along the semi-conductor rods, the resistance of the semi-conductor rod is actively reduced and its load capacity increased, thus preventing the occurrance of surface-wise flashover and effectively passing the thunder current into the ground. Usually, semi-conductor rods are fitted outwaraly on one side of the bottom plane of the supporting base and having an elevation-angle or parallel with the ground reference. As a result of the unlike charges sent into the space in the vicinity by the semiconductor lightning eliminator under the thunder clouds, a spacial layer of charges is formed over the top of the semi-conductor lightning eliminator, weakening significantly the electric field of thunder clouds in the vicinity of the lightning eliminator. In order to effectively create such a spacial layer of charges, the lightning eliminator must be installed at a height not less than 40 m. The radius of the ground area protected by the lightning eliminator is 6 to 9 times as musch as the installation height of the lightning eliminator. Such a layout will reduce a strong thunder stroke of a magnitude of 100 KA to a weak one of less than 30 A. In other words, the thunder current will be reduced by 99% and the remaining thunder current will be too small to cause any damage.

Table 1 lists the advantages of the lightning eliminator accordingly to the invention over the relevant prior art.

Usually, the semi-conductor rods are divided into several groups in such a way that the semi-conductor rods of each group lie in the same plane and that the planes are at right angles with the bottom plane or ground reference of the supporting base. The semiconductors may be made to have the same length. In an embodiment of the invention, the two adjacent semiconductor rods in each plane intercept each other at an angle of 30 deg.

DETAILED DESCRIPTION OF THE PREFERRED EMBODIMENT

In a preferred embodiment in accordance with the invention as shown in the attached drawing, the lightning eliminator comprises a metal supporting base 1 and ten metal installation sleeves fitted outwardly on the metal supporting base 1, each holding a 5 m long, 5 cm thick semi-conductor rod electrically and properly connected to the metal installation sleeve, the semi-conductor rods being made of epoxy resin bars of the same size and specifications and coated with semi-conducting materials including zinc oxide, carbon black and resin. The total electric resistance of the semi-conductor rod is 35 k ohms, and the coefficient of non-linearity of the resistance is less than 0.35. Fitted radially at the top 4 of the semi-conductor rod are four copper tips 5 of a length of 30 cm and a diameter of 4 mm. Every four semi-conductor rods form a plane, thus totaling three planes 8,9 and 10. The three planes 8, 9 and 10 are perpendicular to the ground reference or bottom plane 7 of the supporting base 1 and divide the space equally over this bottom plane 7 of the supporting base, 1 thus positioning the three groups of semi-conductor rods at uniform distances from each other. The angle between any two adjacent semi-conductor rods 2, 3 in any of the three planes 8, 9 and 10 is 30 deg. The semi-conductor rods may be coated with protective painting.

TABLE 1

| | materials | methods of stroke prevention | structures | protected areas | corona current | current limiting effects |
|---|---|---|---|---|---|---|
| the said invention | semiconductor | elimination | few long rods | h:R = 1:6~9 | 15~30 mA | reduction by 99% |
| prior art | conductor | elimination | many short tips | h:R = 1:3 | ≯0.3 mA | nil |

Notes:
h—height of lightning eliminator
R—Radius of ground area with lightning eliminator as center

What is claimed is:

1. A lightning eliminator for the emasculation of strokes of lightning and the reduction of current passing to the ground as a result of strokes of lightning, the lightning eliminator comprising:
   a plurality of semiconductor rods,
   a plurality of metal sleeves,
   a metal support base,
   each semiconductor rod having a first end and a second end, the first end being accommodated in a metal sleeve, each metal sleeve being attached to the metal support base, the metal sleeves and the first ends of the semiconductor rods thereby being electrically connected together,
   the metal support base including a ground reference, the ground reference having an elevation angle of zero,
   the second end of each semiconductor rod being directed outward from the metal support base, the second ends of each semiconductor rod including at least one conductor tip, the second ends of the semiconductor rods defining a generally hemispherical space over the metal support base,
   the semiconductor rods and metal sleeves being divided into a plurality of groups, the semiconductor rods of each group being aligned in a plane, each semiconductor rod being disposed adjacent to at least one adjacent semiconductor rod of the same plane, there being an acute angle between each semiconductor rod and each adjacent semiconductor rod of the same plane,
   the second end of each semiconductor rod being a predetermined distance from the second end each adjacent semiconductor rod, there being a lightning break-down voltage generated due to the predetermined distance between the second ends of the adjacent semiconductor rods, the lightning break-down voltage being less than the flashover voltage on the surface of each semiconductor rod.

2. The lightning eliminator of claim 1, wherein said planes are at right angles with the ground reference and divide the hemispherical space over the metal support plate equally.

3. The lightning eliminator of claim 1, wherein the semi-conductor rods are of equal length.

4. The lightning eliminator of claim 1, wherein the angle between adjacent semiconductor rods of each plan is from about 20 to about 40 degrees.

5. The lightning eliminator of claim 1, wherein the angle between adjacent semiconductor rods of each plane of semiconductor rods is about 30 degrees.

6. The lightning eliminator of claim 1, wherein the length of the semi-conductor rods is from about 2 to about 10 meters.

7. The lightning eliminator of claim 1, wherein the semiconductor rods are of a diameter from about 2 to about 10 centimeters.

8. The lightning eliminator of claim 1, wherein the semi-conductor rods are non-metal bars coated with semi-conducting materials.

9. The lightning eliminator of claim 8, wherein the non-metal bars are epoxy resin bars.

10. The lightning eliminator of claim 1, wherein each semi-conductor rod has a total resistance value of from about 10 to about 100K ohms.

11. The lightning eliminator of claim 1, wherein the semi-conducting coating material is a mixture of zin oxide, carbon black and resin, and the total resistance of the mixture is from about 10 to about 100K ohms.

12. The lightning eliminator of claim 10, wherein the total resistance value of each semiconductor rod is about 35K ohms.

13. The lightning eliminator of claim 11, wherein the total resistance value of each semiconductor rod is about 35K ohms.

14. The lightning eliminator of claim 1, wherein the semi-conductor rods are fitted with four conductor tips.

15. The lightning eliminator of claim 14, wherein the conductor tips are made of copper.

16. The lightning eliminator of claim 14, wherein each conductor tip has a length of from about 20 to about 40 cm and a diameter of from about 3 to about 5 mm.

* * * * *